(12) United States Patent
Martin et al.

(10) Patent No.: US 11,174,658 B2
(45) Date of Patent: Nov. 16, 2021

(54) LOCKING MECHANISM INCLUDING ENERGY STORAGE

(71) Applicant: Level Home, Inc., Redwood City, CA (US)

(72) Inventors: John H. Martin, Atherton, CA (US); Kenneth D. Goto, Emerald Hills, CA (US); Thomas E. King, Redwood City, CA (US); Jordan R. Fountain, Truckee, CA (US)

(73) Assignee: Level Home, Inc., Redwood City, CA (US)

( * ) Notice: Subject to any disclaimer, the term of this patent is extended or adjusted under 35 U.S.C. 154(b) by 758 days.

(21) Appl. No.: 15/709,363

(22) Filed: Sep. 19, 2017

(65) Prior Publication Data

US 2018/0080251 A1 Mar. 22, 2018

Related U.S. Application Data

(60) Provisional application No. 62/396,794, filed on Sep. 19, 2016.

(51) Int. Cl.
*E05B 47/00* (2006.01)
*E05B 47/02* (2006.01)
(Continued)

(52) U.S. Cl.
CPC .......... *E05B 47/0001* (2013.01); *E05B 9/002* (2013.01); *E05B 9/02* (2013.01);
(Continued)

(58) Field of Classification Search
CPC ... E05C 1/00; E05C 1/002; E05C 1/02; E05B 9/00; E05B 2009/004; E05B 2009/006;
(Continued)

(56) References Cited

U.S. PATENT DOCUMENTS 3,396,999 A    8/1968  Knapp
3,966,289 A *  6/1976  Schlage ................. E05B 47/00
                                                        439/248

(Continued)

FOREIGN PATENT DOCUMENTS

GB    2516950 A    2/2015
RU    112930 U1    1/2012
(Continued)

OTHER PUBLICATIONS

International Search Report and Written Opinion dated Dec. 21, 2017, for International Application No. PCT/US17/052354, 5 pages.
(Continued)

*Primary Examiner* — Christine M Mills
(74) *Attorney, Agent, or Firm* — Perkins Coie LLP; Colin Fowler; Brian Coleman

(57) ABSTRACT

An apparatus and method for storing energy in a electromechanical lock. The electromechanical lock can include a main housing and a deadbolt. The main housing can be configured to extend a deadbolt along a path to lock and/or unlock a door. The deadbolt can have a hollow inner region configured to receive an energy storage device. The energy storage device within the deadbolt can be electrically connected to the main housing. The energy storage device can be used to power an actuator and/or accelerometer in the main housing.

37 Claims, 16 Drawing Sheets

(51) Int. Cl.

| | |
|---|---|
| *E05B 17/20* | (2006.01) |
| *E05B 17/22* | (2006.01) |
| *E05B 15/10* | (2006.01) |
| *E05B 15/02* | (2006.01) |
| *E05B 17/00* | (2006.01) |
| *E05B 63/00* | (2006.01) |
| *E05B 33/00* | (2006.01) |
| *E05B 9/02* | (2006.01) |
| *E05B 15/16* | (2006.01) |
| *E05B 51/00* | (2006.01) |
| *E05B 45/06* | (2006.01) |
| *G01P 15/00* | (2006.01) |
| *G07C 9/00* | (2020.01) |
| *E05B 63/06* | (2006.01) |
| *E05B 9/00* | (2006.01) |

(52) U.S. Cl.
CPC .......... *E05B 15/0205* (2013.01); *E05B 15/10* (2013.01); *E05B 15/1621* (2013.01); *E05B 17/0004* (2013.01); *E05B 17/20* (2013.01); *E05B 17/2026* (2013.01); *E05B 17/2049* (2013.01); *E05B 17/22* (2013.01); *E05B 33/00* (2013.01); *E05B 45/06* (2013.01); *E05B 47/00* (2013.01); *E05B 47/0012* (2013.01); *E05B 47/026* (2013.01); *E05B 51/005* (2013.01); *E05B 63/0056* (2013.01); *E05B 63/06* (2013.01); *G01P 15/005* (2013.01); *G07C 9/00174* (2013.01); *G07C 9/00182* (2013.01); *G07C 9/00944* (2013.01); *E05B 2009/004* (2013.01); *E05B 2015/023* (2013.01); *E05B 2045/067* (2013.01); *E05B 2047/002* (2013.01); *E05B 2047/003* (2013.01); *E05B 2047/0016* (2013.01); *E05B 2047/0024* (2013.01); *E05B 2047/0026* (2013.01); *E05B 2047/0034* (2013.01); *E05B 2047/0036* (2013.01); *E05B 2047/0048* (2013.01); *E05B 2047/0058* (2013.01); *E05B 2047/0059* (2013.01); *E05B 2047/0067* (2013.01); *E05B 2047/0069* (2013.01); *E05B 2047/0072* (2013.01); *E05B 2047/0081* (2013.01); *E05B 2047/0084* (2013.01); *E05B 2047/0094* (2013.01); *E05B 2047/0095* (2013.01); *G07C 9/00309* (2013.01); *G07C 2009/0019* (2013.01); *G07C 2009/00412* (2013.01); *G07C 2009/00769* (2013.01); *G07C 2209/62* (2013.01); *Y10S 292/60* (2013.01); *Y10T 292/096* (2015.04); *Y10T 292/0977* (2015.04); *Y10T 292/1021* (2015.04); *Y10T 292/62* (2015.04)

(58) Field of Classification Search
CPC ........ E05B 63/06; E05B 17/0004; E05B 9/02; E05B 15/10; E05B 33/00; E05B 47/0001; E05B 47/00; E05B 2047/0016; E05B 2047/0095; E05B 2047/0036; E05B 2047/0054; E05B 2047/0048; E05B 47/026; E05B 2047/0058; E05B 2047/0094; G01P 15/005; Y10T 292/096; Y10T 292/1014; Y10T 292/1021; Y10T 292/62; Y10T 292/06
USPC .......... 292/137, 138, 144, 337, 1.5
See application file for complete search history.

(56) References Cited

U.S. PATENT DOCUMENTS

| | | | |
|---|---|---|---|
| 4,406,486 A | 9/1983 | White | |
| 4,557,121 A | 12/1985 | Charlton | |
| 4,579,376 A | 4/1986 | Charlton | |
| 4,702,095 A | 10/1987 | Ben-asher | |
| 4,725,086 A | 2/1988 | Shen | |
| 4,793,166 A | 12/1988 | Marks et al. | |
| 4,866,961 A | 9/1989 | Yang | |
| 4,904,005 A | 2/1990 | Frolov | |
| 4,913,475 A | 4/1990 | Bushnell et al. | |
| 4,950,008 A | 8/1990 | Fang | |
| 5,035,450 A | 7/1991 | Muller | |
| 5,083,122 A | 1/1992 | Clark | |
| 5,206,782 A | 4/1993 | Landmeier et al. | |
| 5,280,881 A | 1/1994 | Karmin | |
| 5,339,662 A | 8/1994 | Goldman | |
| 5,360,243 A | 11/1994 | Hirsh | |
| 5,386,713 A | 2/1995 | Wilson | |
| 5,473,922 A | 12/1995 | Bair et al. | |
| 5,551,264 A * | 9/1996 | Fann | E05B 9/02 292/1.5 |
| 5,562,314 A | 10/1996 | Wheatland et al. | |
| 5,593,191 A | 1/1997 | Demarco | |
| 5,694,798 A | 12/1997 | Nunez et al. | |
| 5,765,412 A * | 6/1998 | Koskela | E05B 63/0017 292/1.5 |
| 5,791,179 A | 8/1998 | Brask | |
| 5,852,944 A | 12/1998 | Collard et al. | |
| 5,862,693 A | 1/1999 | Myers et al. | |
| 5,911,460 A | 6/1999 | Hawkins et al. | |
| 5,941,578 A | 8/1999 | Shamblin | |
| 5,957,510 A | 9/1999 | Kuo | |
| 6,012,310 A | 1/2000 | Hsiao | |
| 6,035,675 A | 3/2000 | Zimmer et al. | |
| 6,035,676 A | 3/2000 | Hudspeth | |
| 6,046,681 A * | 4/2000 | Solop | E05B 47/026 340/5.26 |
| 6,050,623 A | 4/2000 | Martus et al. | |
| 6,079,755 A | 6/2000 | Chang | |
| 6,098,433 A | 8/2000 | Maniaci | |
| 6,318,769 B1 | 11/2001 | Kang | |
| 6,363,763 B1 | 4/2002 | Geringer et al. | |
| 6,381,999 B1 * | 5/2002 | Doong | E05B 47/0012 292/144 |
| 6,619,085 B1 * | 9/2003 | Hsieh | E05B 47/0012 292/144 |
| 6,669,249 B1 | 12/2003 | Huang et al. | |
| 6,764,112 B2 | 7/2004 | Lan-Shi et al. | |
| 6,830,217 B2 | 12/2004 | Movsesian et al. | |
| 6,851,290 B1 | 2/2005 | Meier et al. | |
| 6,967,562 B2 * | 11/2005 | Menard | E05B 45/06 292/346 |
| 7,113,070 B2 * | 9/2006 | Deng | E05B 47/0676 340/5.2 |
| 7,237,412 B1 | 7/2007 | Huang | |
| 7,393,022 B1 * | 7/2008 | Shan | E05B 63/06 292/1.5 |
| 7,543,469 B1 | 6/2009 | Tseng et al. | |
| 7,775,072 B2 | 8/2010 | Pullmann et al. | |
| 7,908,896 B1 * | 3/2011 | Olson | E05B 47/068 70/278.1 |
| 8,360,482 B2 | 1/2013 | Viviano | |
| 8,686,869 B2 * | 4/2014 | Sharma | G01D 5/268 340/686.2 |
| 8,690,205 B2 | 4/2014 | Benitez et al. | |
| 8,931,315 B2 | 1/2015 | Frolov et al. | |
| 9,181,730 B1 * | 11/2015 | Peng | E05B 47/0001 |
| 9,322,194 B2 * | 4/2016 | Cheng | E05B 39/00 |
| 9,512,644 B2 * | 12/2016 | Lambrou | E05B 47/0001 |
| 9,512,645 B2 | 12/2016 | Lowder et al. | |
| 9,562,370 B2 | 2/2017 | Ohl et al. | |
| 9,574,372 B2 * | 2/2017 | Johnson | E05B 47/02 |
| 9,580,934 B2 | 2/2017 | Baty et al. | |
| 9,758,990 B2 * | 9/2017 | Beck | E05C 1/06 |
| 9,816,292 B2 | 11/2017 | Mckibben et al. | |

(56) References Cited

U.S. PATENT DOCUMENTS

| | | | |
|---|---|---|---|
| 9,879,445 B2* | 1/2018 | Gopalakrishnan | E05B 15/00 |
| 10,047,544 B2 | 8/2018 | Yen et al. | |
| 10,174,524 B2 | 1/2019 | Frolov et al. | |
| 10,329,801 B2* | 6/2019 | Martin | E05B 55/00 |
| 10,364,594 B2* | 7/2019 | Martin | E05B 17/2049 |
| 10,465,422 B2 | 11/2019 | Ullrich et al. | |
| 10,513,872 B2 | 12/2019 | Kumar et al. | |
| 10,557,286 B2* | 2/2020 | Martin | E05B 17/20 |
| 10,577,831 B2* | 3/2020 | Martin | E05B 33/00 |
| 10,683,677 B1 | 6/2020 | Funamura et al. | |
| 10,704,292 B2* | 7/2020 | Martin | E05B 17/0004 |
| 10,753,124 B2* | 8/2020 | Martin | E05B 47/00 |
| 10,829,954 B2 | 11/2020 | Martin et al. | |
| 2002/0157432 A1 | 10/2002 | Cowper | |
| 2003/0024288 A1 | 2/2003 | Gokcebay et al. | |
| 2004/0089038 A1 | 5/2004 | Iijima | |
| 2005/0029345 A1* | 2/2005 | Waterhouse | E05B 47/00 235/382 |
| 2005/0144994 A1 | 7/2005 | Lies et al. | |
| 2006/0114099 A1* | 6/2006 | Deng | G07C 9/00563 340/5.53 |
| 2006/0192396 A1* | 8/2006 | Frolov | E05C 1/163 292/169 |
| 2007/0157684 A1 | 7/2007 | Bogdanov et al. | |
| 2007/0257773 A1 | 11/2007 | Hill et al. | |
| 2008/0011030 A1 | 1/2008 | Ferreira et al. | |
| 2008/0011032 A1 | 1/2008 | Groff | |
| 2008/0169890 A1 | 7/2008 | Irwin | |
| 2008/0196457 A1 | 8/2008 | Goldman | |
| 2009/0178449 A1 | 7/2009 | Raatikainen | |
| 2010/0257906 A1 | 10/2010 | Sorensen et al. | |
| 2011/0066288 A1 | 3/2011 | Sparenberg et al. | |
| 2011/0259059 A1 | 10/2011 | Wu et al. | |
| 2012/0036904 A1 | 2/2012 | Chang | |
| 2012/0167646 A1 | 7/2012 | Sharma et al. | |
| 2012/0192602 A1 | 8/2012 | Bacon | |
| 2012/0234059 A1* | 9/2012 | Viviano | E05B 13/005 70/129 |
| 2013/0168981 A1 | 7/2013 | Stendal | |
| 2013/0276488 A1 | 10/2013 | Haber | |
| 2014/0109632 A1* | 4/2014 | Horne | E05B 47/026 70/77 |
| 2014/0265359 A1* | 9/2014 | Cheng | E05B 47/026 292/144 |
| 2015/0027178 A1 | 1/2015 | Scalisi | |
| 2015/0096340 A1 | 4/2015 | Kim | |
| 2015/0102609 A1 | 4/2015 | Johnson et al. | |
| 2015/0102610 A1 | 4/2015 | Johnson et al. | |
| 2015/0114055 A1 | 4/2015 | Frolov et al. | |
| 2015/0128667 A1 | 5/2015 | Yoon et al. | |
| 2015/0135307 A1 | 5/2015 | Nguyen et al. | |
| 2015/0167225 A1 | 6/2015 | Park et al. | |
| 2015/0176310 A1 | 6/2015 | Min et al. | |
| 2015/0191936 A1 | 7/2015 | Chen | |
| 2015/0211260 A1 | 7/2015 | Chen | |
| 2015/0292240 A1* | 10/2015 | Ribas | E05B 39/00 292/137 |
| 2015/0308157 A1 | 10/2015 | Lin et al. | |
| 2015/0315816 A1 | 11/2015 | Gopalakrishnan et al. | |
| 2016/0040454 A1* | 2/2016 | Viviano | E05B 63/0017 70/129 |
| 2016/0049025 A1* | 2/2016 | Johnson | G08B 13/1966 340/5.61 |
| 2017/0051533 A1 | 2/2017 | Kester et al. | |
| 2017/0204636 A1* | 7/2017 | Sack | G07C 9/00182 |
| 2017/0211295 A1 | 7/2017 | Lin et al. | |
| 2017/0275926 A1* | 9/2017 | Kumar | E05B 9/02 |
| 2017/0284131 A1 | 10/2017 | Lin et al. | |
| 2018/0051478 A1* | 2/2018 | Tagtow | E05B 47/0012 |
| 2018/0051480 A1* | 2/2018 | Tagtow | E05B 9/002 |
| 2018/0080247 A1* | 3/2018 | Martin | E05B 45/06 |
| 2018/0080250 A1* | 3/2018 | Martin | E05B 17/2026 |
| 2018/0080252 A1* | 3/2018 | Martin | E05B 47/0012 |
| 2018/0080253 A1* | 3/2018 | Martin | E05B 9/02 |
| 2018/0171667 A1* | 6/2018 | Martin | E05B 9/002 |
| 2018/0171668 A1* | 6/2018 | Martin | E05B 47/026 |
| 2018/0171669 A1* | 6/2018 | Martin | E05B 47/026 |
| 2018/0171671 A1 | 6/2018 | Martin et al. | |
| 2018/0171672 A1 | 6/2018 | Lin et al. | |
| 2018/0298642 A1 | 10/2018 | Tagtow et al. | |
| 2018/0313116 A1 | 11/2018 | Criddle et al. | |
| 2018/0320413 A1 | 11/2018 | Wong | |
| 2018/0340350 A1 | 11/2018 | Johnson et al. | |
| 2019/0093392 A1 | 3/2019 | Schwab et al. | |
| 2019/0178004 A1 | 6/2019 | Ho | |
| 2019/0213813 A1 | 7/2019 | Chong et al. | |
| 2019/0277059 A1 | 9/2019 | Robertson | |
| 2019/0277062 A1 | 9/2019 | Tagtow et al. | |
| 2019/0301202 A1 | 10/2019 | Kwon | |
| 2019/0309541 A1 | 10/2019 | Frolov et al. | |
| 2019/0352946 A1 | 11/2019 | Yadollahi et al. | |
| 2020/0063463 A1* | 2/2020 | Martin | E05B 9/002 |
| 2020/0071958 A1* | 3/2020 | Martin | E05B 63/06 |
| 2020/0263450 A1* | 8/2020 | Martin | E05B 47/00 |

FOREIGN PATENT DOCUMENTS

| | | |
|---|---|---|
| RU | 118954 U1 | 8/2012 |
| RU | 142055 U1 | 6/2014 |

OTHER PUBLICATIONS

International Search Report and Written Opinion dated Dec. 21, 2017, for International Application No. PCT/US17/052356, 5 pages.

International Search Report and Written Opinion dated Dec. 28, 2017, for International Application No. PCT/US17/052347, 7 pages.

* cited by examiner

LOCKING MECHANISM INCLUDING ENERGY STORAGE

CLAIM FOR PRIORITY

This application claims the benefit of U.S. Provisional Application No. 62/396,794, entitled "METHOD, SYSTEM AND APPARATUS FOR A FULLY FUNCTIONAL MODERN DAY SMART LOCK," filed on Sep. 19, 2016, which is incorporated herein by reference in its entirety.

TECHNICAL FIELD

The present application relates to a locking mechanism, and more specifically to a locking mechanism including energy storage.

BACKGROUND

Locks can be configured to fasten doors to inhibit unauthorized entry into buildings. Conventional deadbolts are moved to an open position by rotating a lock cylinder with a key. Conventional spring bolt locks use a spring to hold a bolt in place, allowing retraction by applying force to the bolt itself. A deadbolt is often used to complement a spring-bolt lock on an entry door to a building.

A cylinder operated conventional deadbolt can be either single cylinder or double cylinder. A single cylinder deadbolt will accept a key on one side of the lock, but is operated by a twist knob on the other side. A double cylinder deadbolt will accept a key on both sides and therefore does not require (and often do not have) any twist knob. Some deadbolts also have a lockable knob so that a key is always needed on one side (e.g., external), and a twist knob can be used on the other (e.g., internal), unless a button has been pressed, in which case a key is also needed on the internal side.

Currently available electronic deadbolts require cumbersome hardware extending out of a door. For example, some conventional electronic deadbolts include a large cylinder that protrudes out of a door. A side of the cylinder can include a paddle, or a twist knob. The rotation of the cylinder using the key (inserted into the key slot and rotated) or the paddle (moved or rotated to another position) can result in the deadbolt of the lock to retract (e.g., to unlock the door) or extend (e.g., to lock the door). However, some homeowners find it cumbersome to be limited to locking or unlocking the door lock of a door using the key or the paddle. Additionally, the homeowner might not know whether the door is fully locked, or the state of the door lock when away from the home.

SUMMARY

Some of the subject matter described herein includes an apparatus and method for storing energy in a electromechanical lock. The electromechanical lock can include a main housing and a deadbolt. The main housing can be configured to extend and/or retract a deadbolt along a path to lock and/or unlock a door. The main housing can include an actuator coupled with a bolt carriage attachable to the deadbolt. The actuator can be configured to retract the deadbolt to operate in an unlocked state. The actuator can be configured to extend the deadbolt into a deadbolt slot in a locked state. Activating the actuator can cause the bolt carriage to extend or retract an attached deadbolt. The housing can include an accelerometer configured to rotate along a non-linear path as the electromechanical lock transitions between an unlocked state and a locked state, wherein the accelerometer is configured to determine a gravity vector representing an inclination of the accelerometer along the non-linear path. The accelerometer and/or the actuator can be powered by an energy storage device within the deadbolt.

The deadbolt can have a hollow inner region configured to receive an energy storage device. The hollow inner region extends a length of the deadbolt. The deadbolt can be approximately cylindrically shaped. The deadbolt can be composed of a material including a nitride metal, a precipitation hardened alloy, or a combination thereof. The deadbolt can be case hardened using one or more case hardening methods such as, for example, nitriding, carburization, precipitation hardening, or other tempering applications. The deadbolt can include an attachment mechanism configured to attach to a bolt carriage of the main housing, wherein the bolt carriage is configured to move the deadbolt along the path. The bolt carriage can include an electrical connection and attachment mechanism for the deadbolt. The electrical connection can be configured to direct an electric current from the energy storage device to the main housing. The attachment mechanism can be configured to move the deadbolt along the path to lock and/or unlock the door.

The energy storage device can include an electrochemical cell. The energy storage device within the deadbolt can be electrically connected to the main housing. The energy storage device can be used to power an actuator and/or accelerometer in the main housing.

A deadbolt cap can be attachable to the deadbolt. The deadbolt cap can be configured to secure the energy storage device within the deadbolt. A bolt sleeve can surround the deadbolt. An outer surface of the deadbolt can be adjacent to an inner surface of the bolt sleeve. Extending and/or retracting the deadbolt can cause the deadbolt to move in and out through the bolt sleeve. A bolt housing can surround the bolt sleeve and the deadbolt. An inner surface of the bolt housing can be adjacent to an outer surface of the bolt sleeve. The bolt housing can include an attachment mechanism configured to attach to the main housing.

A deadbolt extension device can be used to adapt the electromechanical lock to doors of various sizes. The deadbolt extension device can include another electrical connection and another attachment mechanism for the deadbolt. The another electrical connection can be configured to electrically connect the deadbolt with the main housing. The another attachment mechanism can be configured to attach the deadbolt a pre-defined distance apart from the main housing.

DETAILED DESCRIPTION

Figure 1:
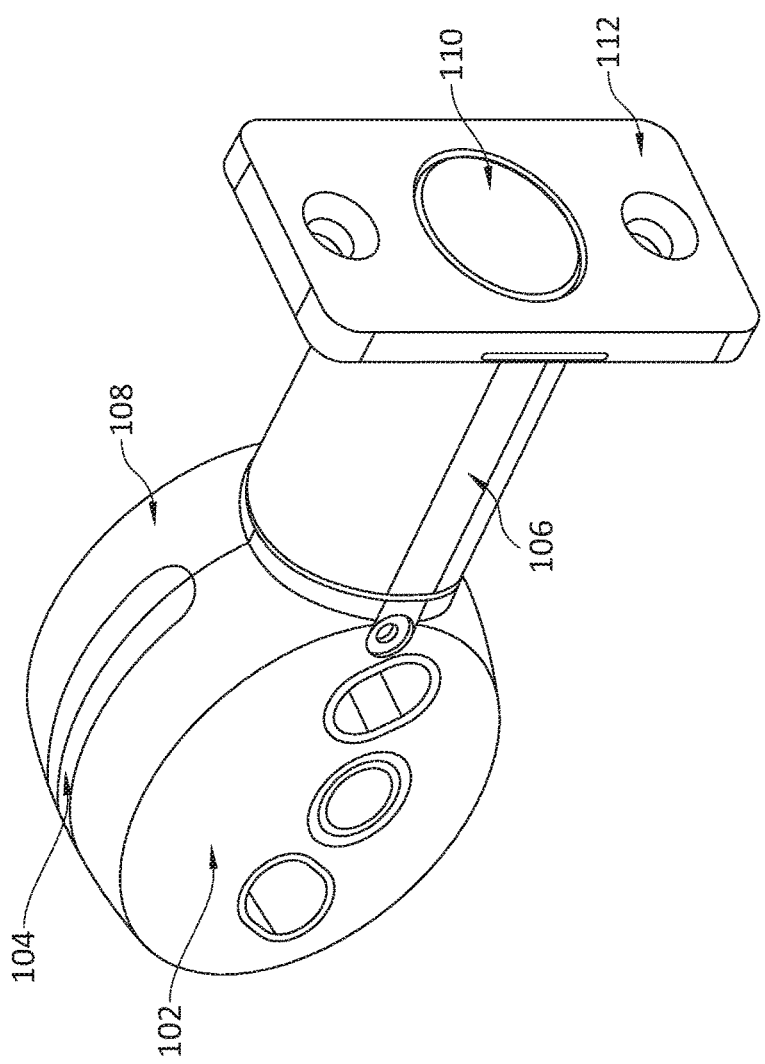
FIG. 1 shows an isometric view of an electromechanical locking mechanism, according to an embodiment.

Embodiments of the technology disclosed herein include an electromechanical lock configured to lock and unlock a door. The electromechanical lock can include a main housing and a deadbolt. The deadbolt can include an energy storage device. The deadbolt can be electrically connected to the main housing. The energy storage device can power one or more components of the main housing.

The main housing can include an actuator, an accelerometer, and a controller circuit. The actuator can be configured to retract the deadbolt into the electromechanical lock to operate in the unlock state, and configured to extend the deadbolt into the deadbolt slot in the lock state. The accelerometer can be coupled with a component of the electromechanical lock that is configured to rotate along a non-linear path (e.g., a curved path) as the electromechanical lock transitions between the unlock state and the lock state. The accelerometer can be configured to determine a gravity vector representing an inclination of the accelerometer along the non-linear path. The controller circuit can be configured to receive an instruction via wireless communication from a mobile device (e.g., mobile phone, smart watch, electronic ring, tablet, etc.) indicating that the electromechanical lock should lock the door of the home by transitioning from the unlock state to the lock state; cause the actuator to extend the deadbolt along the linear path towards the deadbolt slot to lock the door; receive the gravity vector determined by the accelerometer as it rotates along the non-linear path; determine a position of the deadbolt along the linear path based on the gravity vector; determine that the position of the deadbolt along the linear path corresponds to an endpoint of the non-linear path of the accelerometer; and cause the actuator to stop extending the deadbolt based on the determination that the position of the deadbolt along the linear path corresponds to the endpoint of the non-linear path of the accelerometer.

The deadbolt can be configured to travel along a linear path to a deadbolt slot of a door jamb as the electromechanical lock transitions from an unlock state to unlock the door and a lock state to lock the door. The deadbolt can have a hollow inner region configured to receive an energy storage device. The hollow inner region extends a length of the deadbolt. The deadbolt can be approximately cylindrically shaped. The deadbolt can be composed of a material including a nitride metal, a precipitation hardened alloy, or a combination thereof. The deadbolt can include an attachment mechanism configured to attach to a bolt carriage of the main housing, wherein the bolt carriage is configured to move the deadbolt along the path. The bolt carriage can include an electrical connection and attachment mechanism for the deadbolt. The electrical connection can be configured to direct an electric current from the energy storage device to the main housing. The attachment mechanism can be configured to move the deadbolt along the path to lock and/or unlock the door.

The energy storage device can include an electrochemical cell. The energy storage device within the deadbolt can be electrically connected to the main housing. The energy storage device can be used to power an actuator and/or accelerometer in the main housing.

A deadbolt cap can be attachable to the deadbolt. The deadbolt cap can be configured to secure the energy storage device within the deadbolt. A bolt sleeve can surround the deadbolt. An outer surface of the deadbolt can be adjacent to an inner surface of the bolt sleeve. Extending and/or retracting the deadbolt can cause the deadbolt to move in and out through the bolt sleeve. A bolt housing can surround the bolt sleeve and the deadbolt. An inner surface of the bolt housing can be adjacent to an outer surface of the bolt sleeve. The bolt housing can include an attachment mechanism configured to attach to the main housing.

A deadbolt extension device can be used to adapt the electromechanical lock to doors of various sizes. The deadbolt extension device can include another electrical connection and an additional attachment mechanism for the deadbolt. The additional electrical connection can be configured to electrically connect the deadbolt with the main housing. The additional attachment mechanism can be configured to attach the deadbolt a pre-defined distance apart from the main housing.

FIG. 1 shows an isometric view of an electromechanical lock, according to an embodiment. The electromechanical lock can include a main housing, a bolt housing 106, and a front plate 112. The main housing is configured to enter a bore hole of a door. The main housing can fit entirely within a bore hole of a door. For example, the main housing can be approximately cylindrically shaped and can have a diameter of approximately 2 inches (e.g., 2.1 inches). The bolt housing is configured to enter a cross bore of a door. For example, the bolt housing 106 can be approximately cylindrically shaped and have a diameter of approximately 1 inch (e.g., 0.9 inches) and a length of approximately 1.5 inches (e.g., 1.31 inches, 1.69 inches, etc.).

The main housing can include a left housing 102, a right housing 108, and an antenna cover 104. The main housing can include an antenna (not shown) below the antenna cover 104 configured to communicate with another device (e.g., a mobile device). The main housing can include an actuator (e.g., a shape memory device and/or a motor), an accelerometer, and a controller circuit (e.g., one or more processors). The actuator can cause a deadbolt within the bolt housing to extent and retract. The accelerometer can rotate along a non-linear path (e.g., a curved path) as the deadbolt extends and retracts. The accelerometer can be configured to determine a gravity vector representing an inclination of the accelerometer along the non-linear path. The controller circuit can receive an instruction via wireless communication from a mobile device (e.g., mobile phone, smart watch, electronic ring, tablet, etc.) indicative of a lock or unlock request. The controller circuit can cause the actuator to extend or retract. The controller circuit can receive the gravity vector determined by the accelerometer as it rotates along the non-linear path. The controller circuit can determine a position of the deadbolt along the linear path based on the gravity vector. The controller circuit can determine that the position of the deadbolt along the linear path corresponds to an endpoint of the non-linear path of the accelerometer. The controller circuit can cause the actuator to stop extending the deadbolt based on the determination that the position of the deadbolt along the linear path corresponds to the endpoint of the non-linear path of the accelerometer. The controller circuit can transmit a message indicating a lock state (e.g., locked, unlocked, partially locked, 30% extended, 90% extended, etc.) via the antenna. The message can be transmitted to another device (e.g., a mobile device) directly (e.g., via a personal area network) or indirectly (e.g., via a router configured to relay the message).

The bolt housing 106 can include a deadbolt. The bolt housing 106 can be attachable to an outer surface of the main housing. Upon attaching the bolt housing 106 to the outer surface of the main housing, component(s) of the main housing can be attached to the deadbolt. For example, a bolt carriage can be attached to the deadbolt (e.g., by a portion of the deadbolt sliding into the bolt carriage).

A bolt cap 110 can be attachable to an outer surface of the deadbolt. The bolt cap 110 can be accessible even if the electromechanical lock is installed in a door. For example, the bolt cap 100 can be positioned on a leading edge of the deadbolt. The leading edge of the deadbolt is a portion of the deadbolt adjacent to a front plate 112. The front plate 112 is attachable to an outer surface of the door (e.g., by inserting screws in pre-defined screw holes of the front plate 112).

Figure 2:
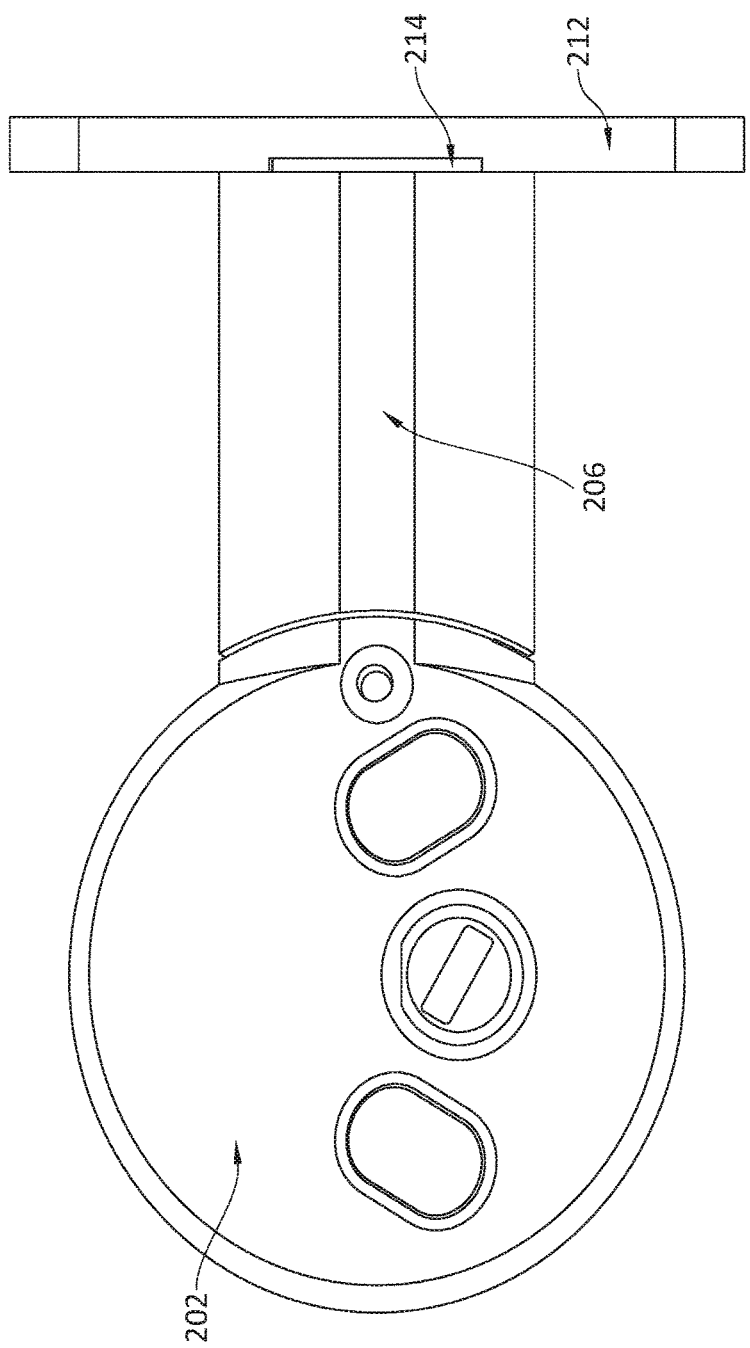
FIG. 2 shows a side view of the electromechanical lock, according to an embodiment.
Figure 3:
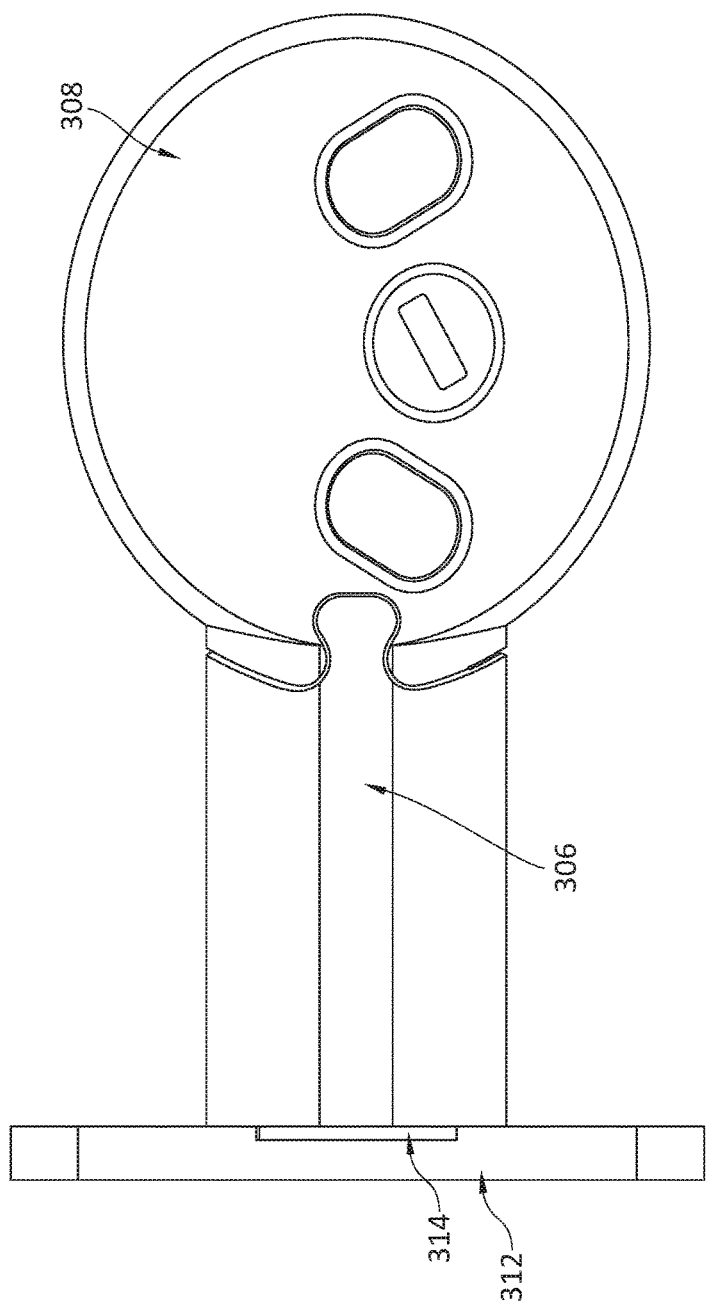
FIG. 3 shows another side view of the electromechanical lock, according to an embodiment.

FIGS. 2 and 3 show side views of the electromechanical lock, according to an embodiment. The electromechanical lock can include a main housing (e.g., including a left housing 202 and a right housing 308), a bolt housing (e.g., bolt housing 206 or bolt housing 306), and a front plate (e.g., front plate 212 or front plate 312). A back plate (e.g., back plate 214 or back plate 314) can provide mobility to the front plate.

Figure 4:
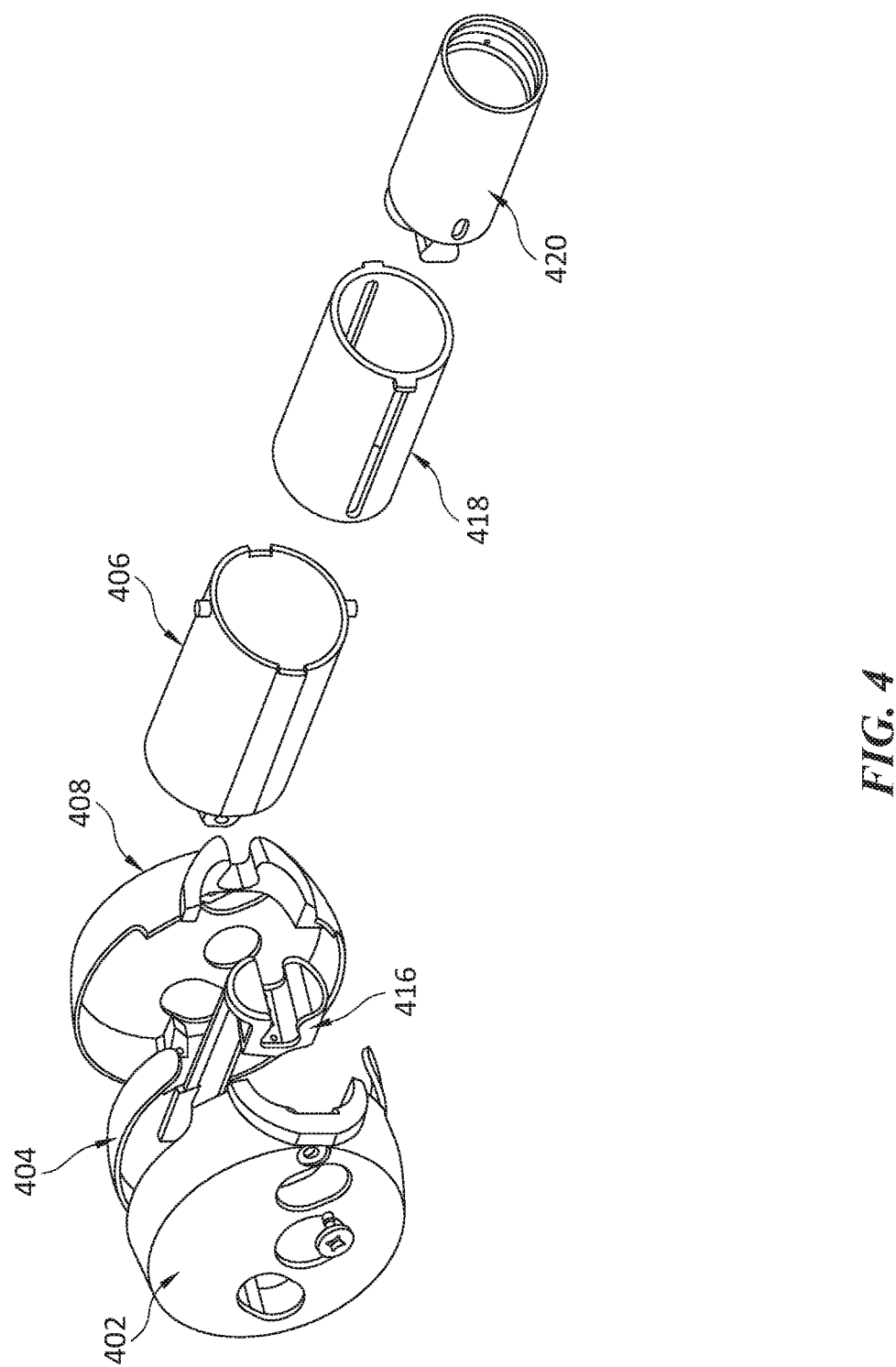
FIG. 4 shows an exploded view of components included in the electromechanical lock, according to an embodiment.

FIG. 4 shows an exploded view of components included in the electromechanical lock, according to an embodiment. A main housing of the electromechanical lock can include a left housing 402, a right housing 408, an antenna cover 404, and a bolt carriage 416. The bolt carriage 416 can be configured to attach to a deadbolt 420. For example, the bolt carriage 416 can include a groove configured to receive a complementary notch of the deadbolt 420. The notch of the deadbolt 420 can slide into the groove of the bolt carriage 416. Upon attaching the bolt carriage 416 and the deadbolt 420, the bolt carriage 417 can move the deadbolt 420 along a linear path through the bolt sleeve 418. The bolt sleeve can be positioned between the deadbolt 420 and a bolt housing 406.

An extension device can be included between the bolt carriage and the bolt housing. The deadbolt extension device can be used to adapt the electromechanical lock to doors of various sizes. The length from an outer surface of a door to an opening for receiving a doorknob and/or a deadbolt is often referred to as a "backset." Common backsets are approximately 2.375 inches but some backsets can be approximately 2.750 inches. The deadbolt extension device can increase a length from the main chassis to an outer edge of the deadlock to accommodate a door having a large backset (e.g., exceeding 2.375 inches). The deadbolt extension device can include another electrical connection and another attachment mechanism for the deadbolt. The another electrical connection can be configured to electrically connect the deadbolt with the main housing. The another attachment mechanism can be configured to attach the deadbolt a pre-defined distance apart from the main housing. The pre-defined distance can be approximately 0.375 inches.

Figure 5A:
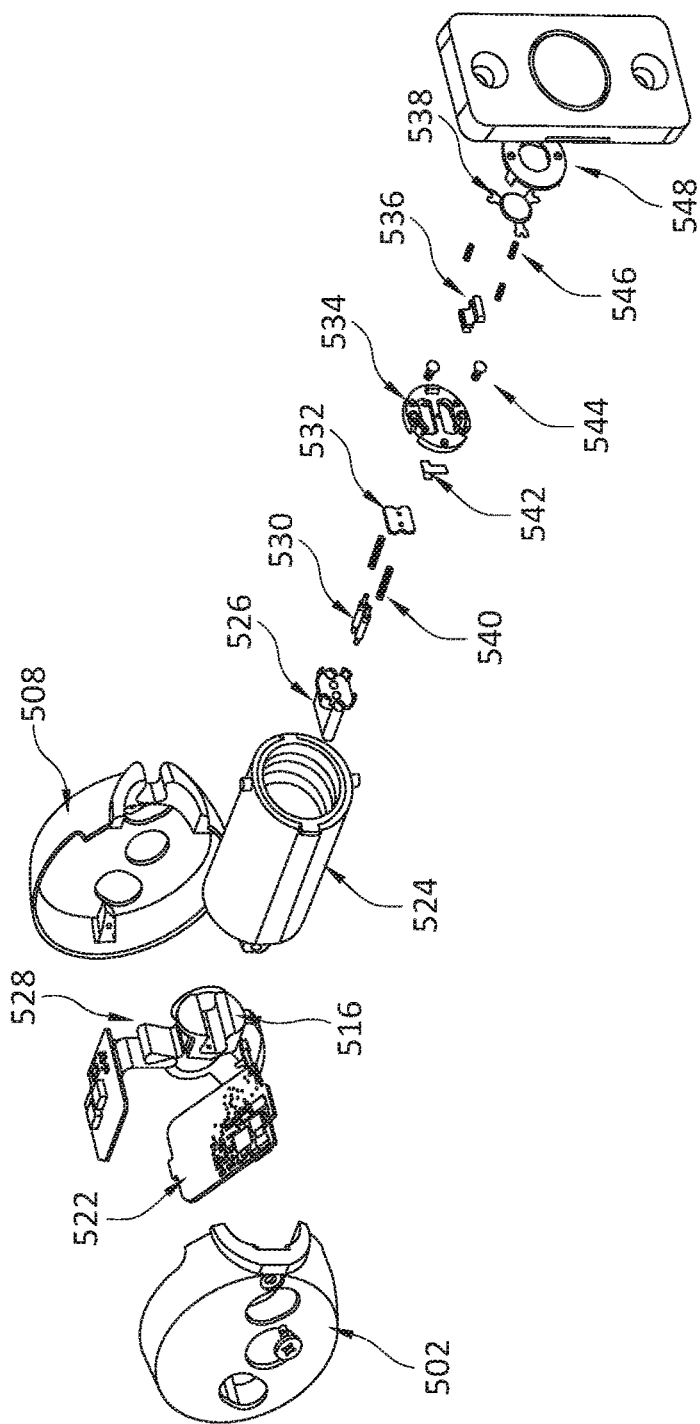
FIG. 5A shows an exploded view of components included in the electromechanical lock, according to an embodiment.
Figure 5B:
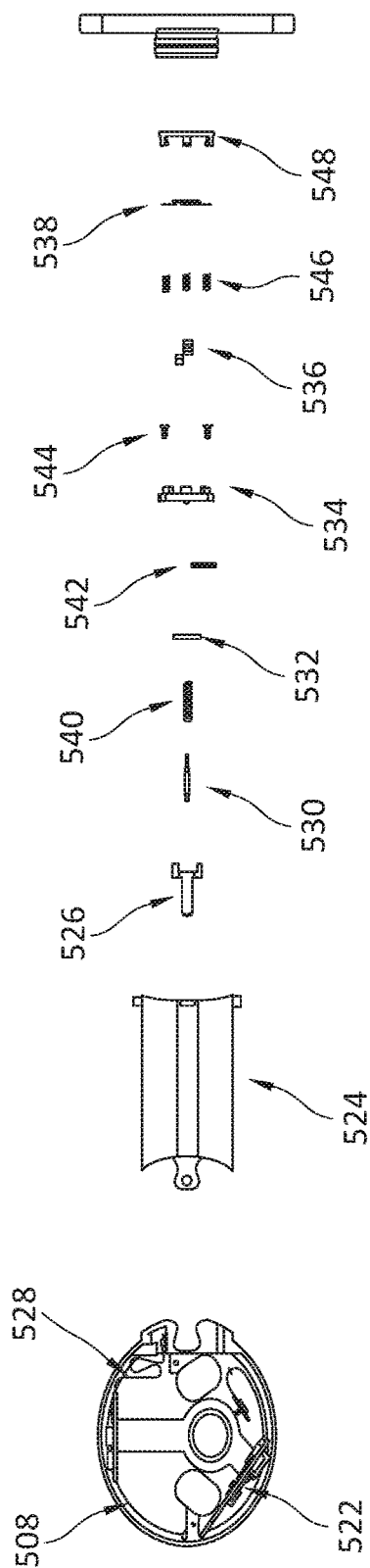
FIG. 5B shows an exploded view of components included in the electromechanical lock, according to an embodiment.

FIGS. 5A and 5B show an exploded isometric view and an exploded side view, respectively, of components of the electromechanical lock, according to an embodiment. The main chassis of the electromechanical lock can include a left housing 502, a right housing 508, a controller circuit 522, an actuator (not shown), a flexible printed circuit board (PCB) 528, and a bolt carriage 516. The left housing 502 and right housing 508 can form an outer surface of the main chassis. The controller circuit 522 (e.g., computer system 1200 of FIG. 12) can control the actuator. The controller circuit 522 can also manage communication with other devices (e.g., a mobile device) and perform functions in response to receiving messages from the other devices. For example, the controller circuit 522 can cause the actuator to extend the bolt carriage 516 in response to receiving a message indicative of locking. In another example, the controller circuit 522 can cause the actuator to retract the bolt carriage 616 in response to receiving a message indicative of unlocking. An antenna within the main chassis can relay message to the controller circuit 522.

Electric power can be stored in a deadbolt 524 and transferred to the main chassis. An energy storage device within the deadbolt 524 can be electrically connected to one or more components in the main chassis. The energy storage device can include, for example, an electrochemical cell (e.g., a flow battery, ultrabattery, and/or recharchable battery), a capacitor (e.g., a supercapacitor), an energy storage coil (e.g., a superconducting magnetic energy storage device), a compressed air energy storage device, a flywheel, a hydraulic accumulator, a chemical energy storage device (e.g., hydrogen storage), or any combination of energy storage devices. Electric current can flow from an energy storage device to a positive contact 538, a positive busbar 536, a negative busbar 542, a board-to-board connector 532, one or more pogo pins 530, and into the bolt carriage 516 where the electric current can be directed into one or more components of the main chassis (e.g., the controller circuit 522, another circuit, the antenna, the actuator, or any combination thereof). One or more components can be used to resist or arrest mechanical movement of electrical devices such as, for example, a plate 548, a detent plate 534, springs 546, screws 544, springs 542, and male detent connector 526.

Figure 6A:
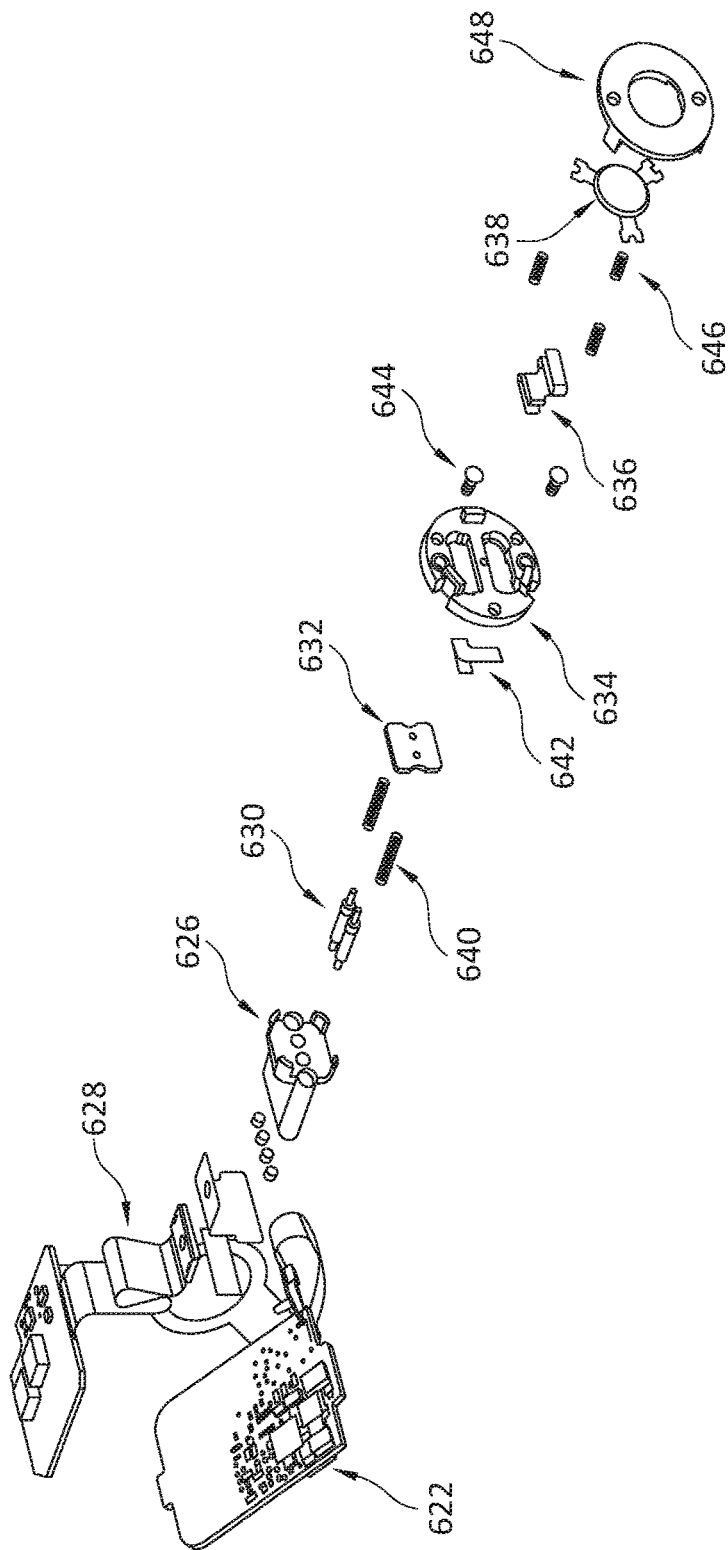
FIG. 6A shows an exploded view of components included in the electromechanical lock, according to an embodiment.
Figure 6B:
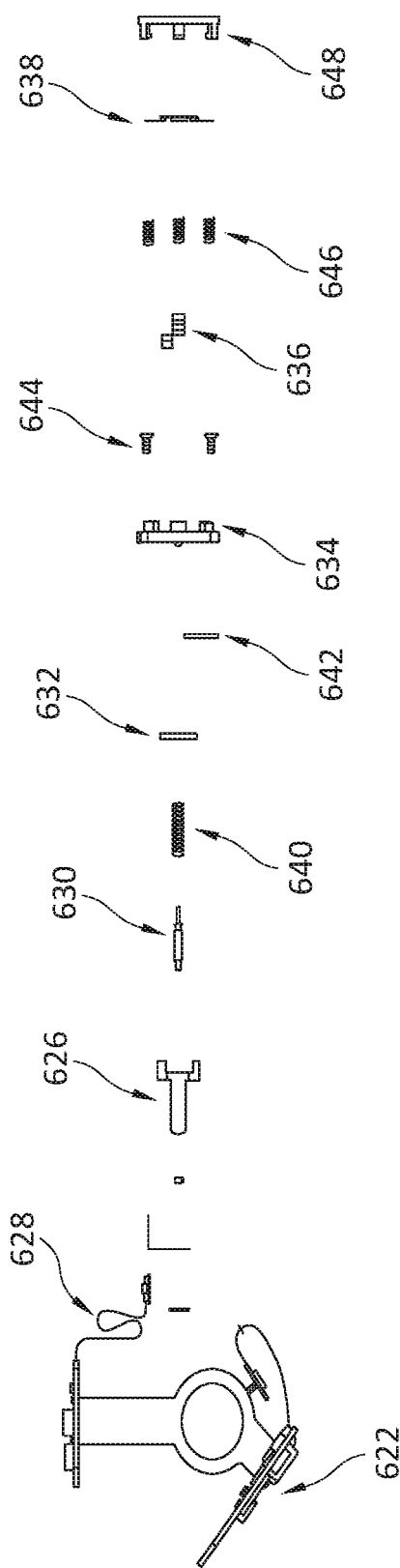
FIG. 6B shows an exploded view of components included in the electromechanical lock, according to an embodiment.

FIGS. 6A and 6B show an exploded isometric view and an exploded side view, respectively, of components of the electromechanical lock, according to an embodiment. A controller circuit 622, an actuator (not shown), and a flexible PCB 628 can be contained within a main housing of the electromechanical lock. The controller circuit 622 can include a printed circuit board. The controller circuit 622 can manage components of the electromechanical lock including, for example, the actuator, an antenna, or a combination thereof.

In an embodiment, the actuator can be an electric motor. The controller circuit 622 can activate the electric motor to cause the electric motor to extend and/or retract a bolt carriage. The bolt carriage can be attachable to a deadbolt. If a deadbolt is attached to the bolt carriage, extending and/or retracting the bolt carriage can cause the deadbolt to extend and/or retract.

In an embodiment, the actuator can include a flexible component configured to extend a bolt carriage to a lock position and retract the bolt carriage to an unlock position. The actuator can include a material configured to change shape upon application of a stimulus (e.g., a temperature change and/or an electrical charge). For example, the actuator can include a shape memory alloy and/or a shape memory polymer. The controller circuit 622 can control an electric current through the actuator. The controller circuit 622 can increase the electric current to cause the actuator to extend to the lock position and reduce or eliminate the electric current to cause the actuator to retract to the unlock position.

The electric current can be received from an energy storage device in a deadbolt. One or more components can deliver the electric current from the energy storage device to the main chassis. For example, a positive contact 638 and/or a positive plate 648 can be in contact with the energy storage device. An electric current can be transmitted through the positive contact 638 and/or the positive plate 648 to one or more busbars (e.g., busbar 636 and/or busbar 642), a board-to-board connector 632, one or more pogo pins 630, or any combination thereof. The one or more pogo pins 630 can be electrically connected to a component of the main chassis (e.g., the bolt carriage) electrically connected to other components of the main chassis (e.g., the controller circuit 622, actuator, an antenna, one or more switches, or any combination thereof). One or more switches can be managed by the controller circuit 622 to direct and/or redirect power delivery to any component in the main chassis.

One or more components can be used to resist or arrest mechanical movement of electrical devices such as, for example, a detent 634, springs 646, screws 644, springs 642, and male detent connector 626. For example, the male detent connector 626 can be secured into a female groove of the bolt carriage configured to align the pogo pins 630 into electrical receiver elements of the bolt carriage. The aligned pogo pins 630 can direct electric current into the electrical receiver elements of the bolt carriage.

Figure 7A:
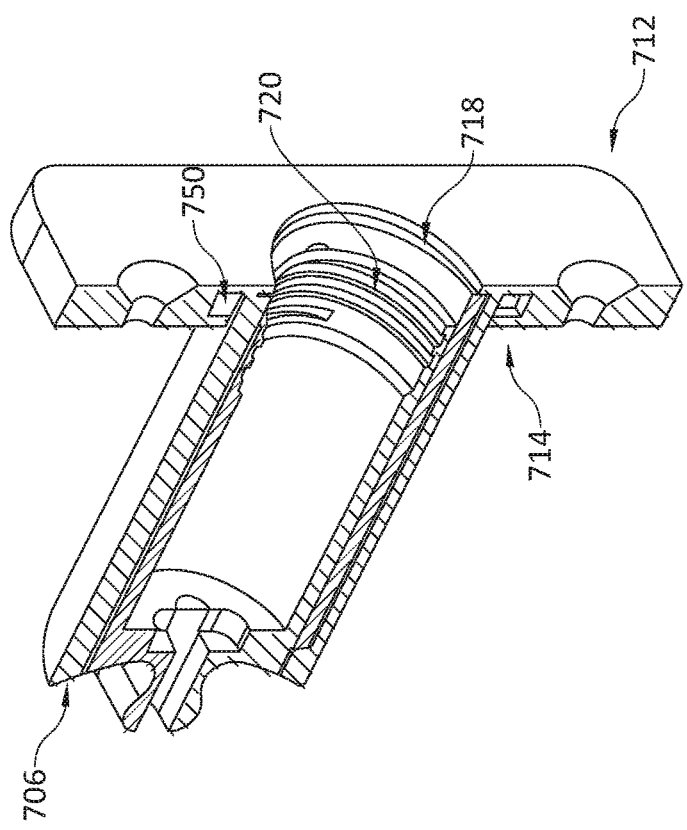
FIG. 7A shows an isometric cross-section view of a bolt housing, according to an embodiment.
Figure 7B:
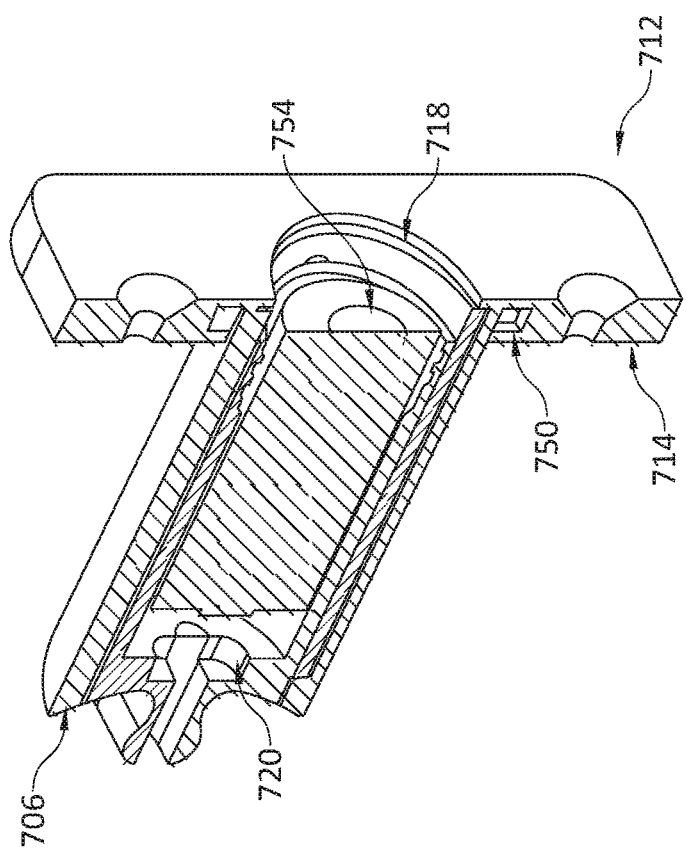
FIG. 7B shows an isometric cross-section view of a bolt housing, a hollow bolt, and an energy storage device, according to an embodiment.

FIGS. 7A and 7B show an isometric cross-section view of a bolt housing 706, according to an embodiment. The bolt housing 706 can be configured to receive a bolt 720. In an embodiment, an inner surface of the bolt 720 can include threads complimentary to threads on a bolt cap. A bolt cap can be attached to the bolt 720 by screwing the bolt cap into the bolt 720. In an embodiment, one or more other attachment mechanisms can be used to attach the bolt cap to the bolt 720. The bolt cap can secure an energy storage device in the bolt 720.

The bolt 720 can rest within a bolt sleeve 718 within the bolt housing 706. The bolt 720 can be extended out of the bolt housing 706 in a lock position and retract within the bolt housing 706 in an unlock position. The bolt 720 can be approximately cylindrically shaped. The bolt 720 can include a hollow inner region configured to receive an energy storage device 754. The energy storage device can include, for example, an electrochemical cell (e.g., a flow battery, ultrabattery, and/or rechargable battery), a capacitor (e.g., a supercapacitor), an energy storage coil (e.g., a superconducting magnetic energy storage device), a compressed air energy storage device, a flywheel, a hydraulic accumulator, a chemical energy storage device (e.g., hydrogen storage), or any combination of energy storage devices. The energy storage device 754 can be approximately cylindrically shaped. A diameter of the energy storage device 754 can be smaller than a diameter of the hollow inner region. The hollow inner region can be approximately cylindrically shaped. The hollow inner region can extend a length of the bolt 720. For example, the hollow inner region can extend from a side of the bolt 729 having an attachment mechanism for a bolt cap to another side of the bolt 720 having an electrical and/or mechanical connection to a main chassis.

The bolt 720 can be composed of a hardened material such as, for example, a nitride metal, a precipitation hardened alloy, or a combination thereof. The hardened material (e.g., steel or stainless) can be case-hardened or through hardened to increase the surface hardness of the bolt and/or the strength of the bolt. This can be accomplished via nitriding, carburization, precipitation hardening, other tempering applications, a combination of tempering applications. Despite the use of less material for the bolt 720 (e.g., due to the hollow inner region), the hardened material can enable the bolt 720 to have an approximately equal fracture strength as a conventional deadbolt. Thus, the bolt 720 can provide space for an energy storage device while maintaining structural integrity.

The bolt housing 706 can be attached to a back plate 714 and/or a front plate 712. For example, the bolt housing 706 can be attached to and in contact with the back plate 714. A plate hinge 750 between the back plate 714 and the front plate 712 can allow the front plate 712 to move relative to the bolt housing 706. Movement enabled by the plate hinge 750 can allow the back plate 714 to rest against a door having an uneven surface.

Figure 8A:
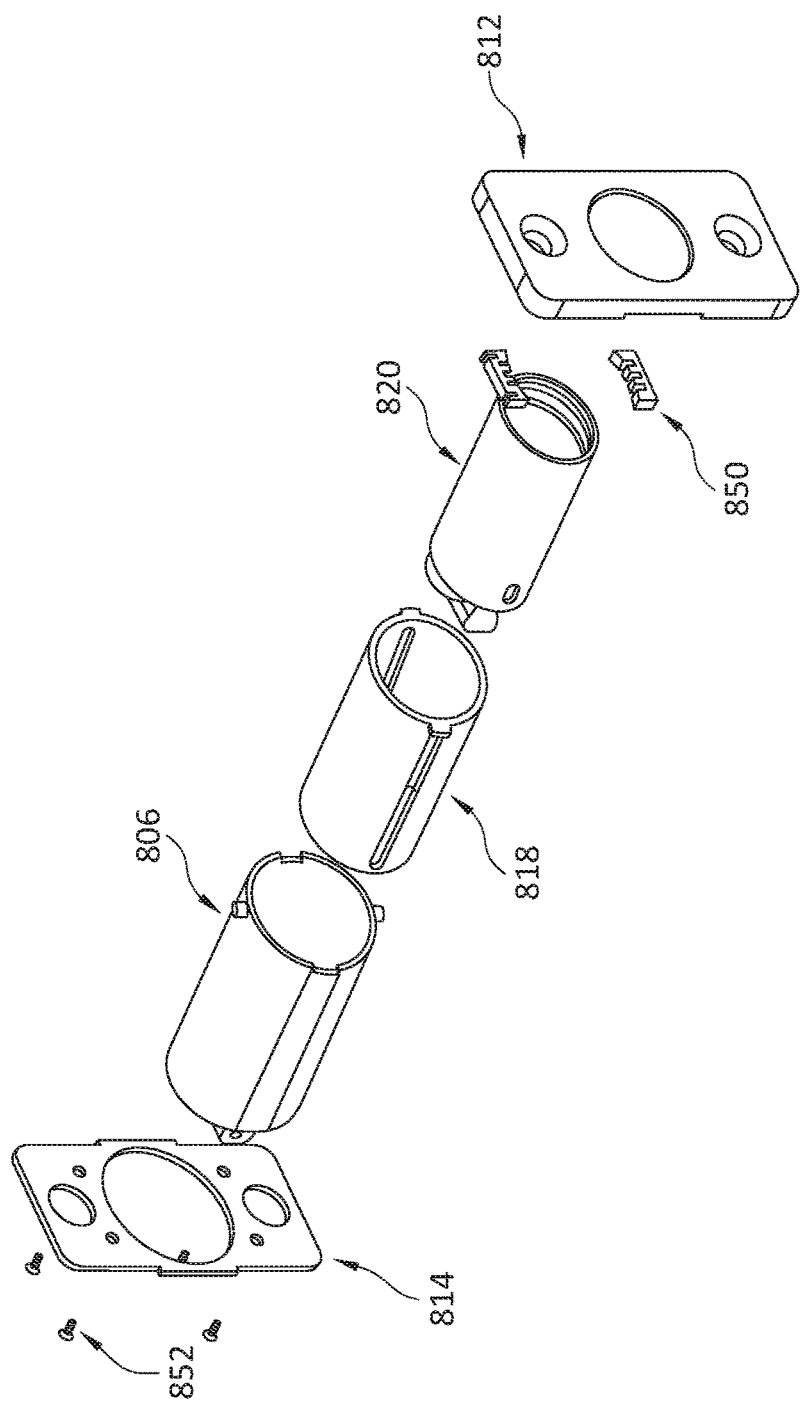
FIG. 8A shows an exploded view of a bolt housing and a hollow bolt, according to an embodiment.
Figure 8B:
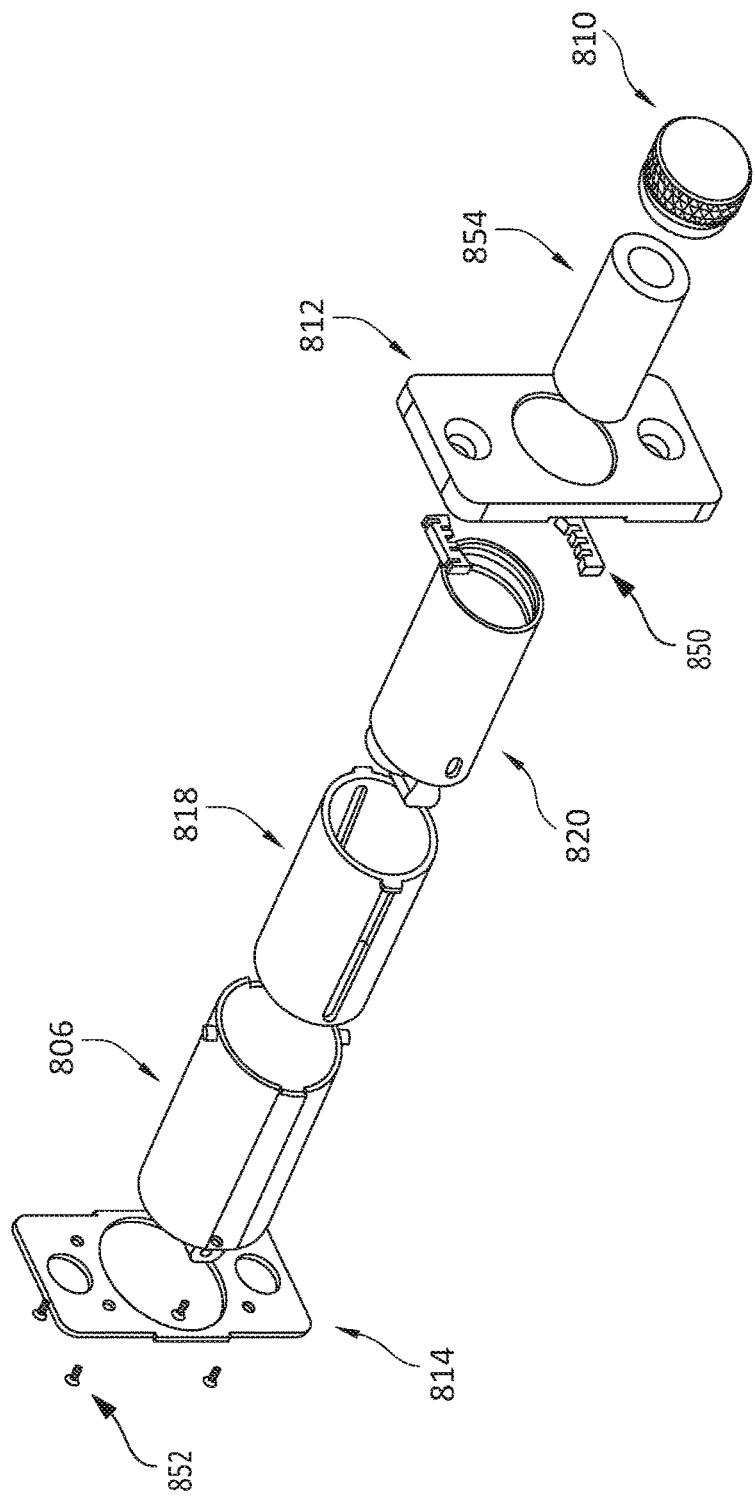
FIG. 8B shows an exploded view of a bolt housing, a hollow bolt, an energy storage device, and a bolt cap, according to an embodiment.

FIGS. 8A and 8B show an exploded view of a bolt housing 806 and a bolt 820, according to an embodiment. The bolt housing 806 (e.g., bolt housing 706 of FIG. 7) can be configured to receive a bolt 820 (e.g., bolt 720 of FIG. 7). For example, the bolt 820 can rest within a bolt sleeve 818 within the bolt housing 806. The bolt 820 can extend out of the bolt sleeve 818 and the bolt housing 806 upon being positioned to a lock state. The bolt 820 can be retracted into the bolt sleeve 818 and the bolt housing 806 upon being positioned to an unlock state.

A back plate 814 (e.g., back plate 714 of FIG. 7) can be attached to a front plate 812 (e.g., front plate 712 of FIG. 7) by an attachment mechanism (e.g., plate screws 852). A plate hinge 850 between the back plate 814 and the front plate 812 can allow the back and front plates 814, 812 to tilt independently of the bolt housing 806 over a range of angles while being attached to the bolt housing 806. Enabling the back and front plates 814, 812 via the plate hinge 850 can allow the back plate 714 to rest against a door having an uneven surface.

Figure 9A:
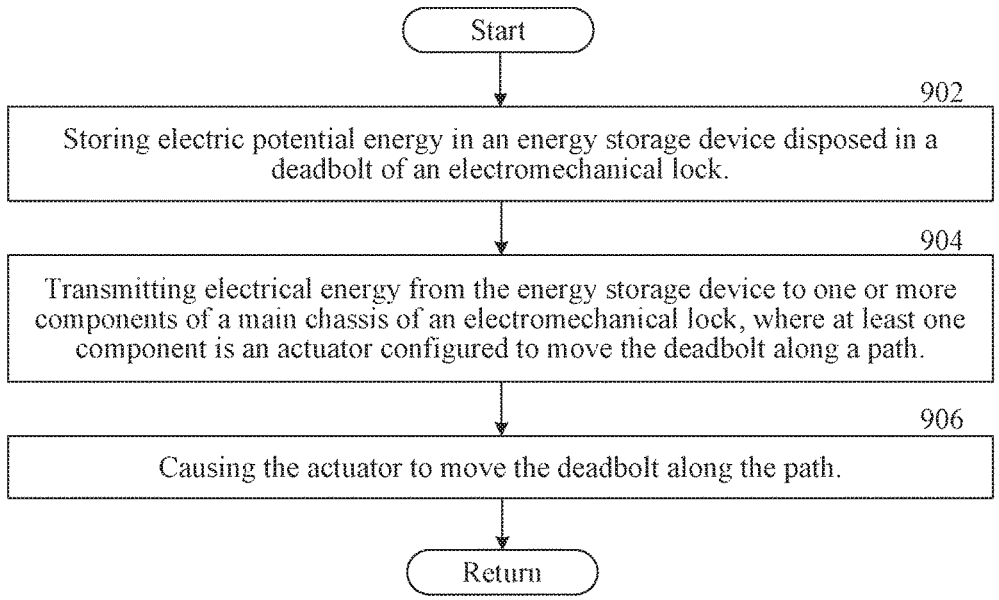
FIG. 9A is a flow diagram of a method for electrically connecting a deadbolt with a main housing, according to an embodiment.

FIG. 9A is a flow diagram of a method for electrically connecting a deadbolt with a main housing, according to an embodiment. Electric potential energy can be stored in an energy storage device disposed in a deadbolt of an electromechanical lock (902). For example, electric potential energy can be stored in a battery disposed in an cylindrical opening in the deadbolt that can be secured with a deadbolt cap. One or more sides of the deadbolt can include an electrical contact (a positive contact and/or a positive plate) configured for contact with the energy storage device. The electrical contact can be electrically connected to a main housing of the electromechanical lock via one or more busbars, a board-to-board connector 632, one or more pogo pins, or any combination thereof. For example, one or more pogo pins can be aligned with conductive components of a bolt carriage attached to the deadbolt. Electrical energy can be transmitted from the energy storage device to one or more components (e.g., a control unit, an actuator, an antenna, etc.) of a main chassis of an electromechanical lock (904). For example, electric energy can be transmitted to an actuator configured to move the deadbolt along a path. Transmitting electrical energy to the actuator can cause the actuator to move the deadbolt along the path (906). Delivery of electrical energy to the actuator can be controlled by a control unit. The control unit can also receive power from the energy storage device disposed in the deadbolt.

Figure 9B:
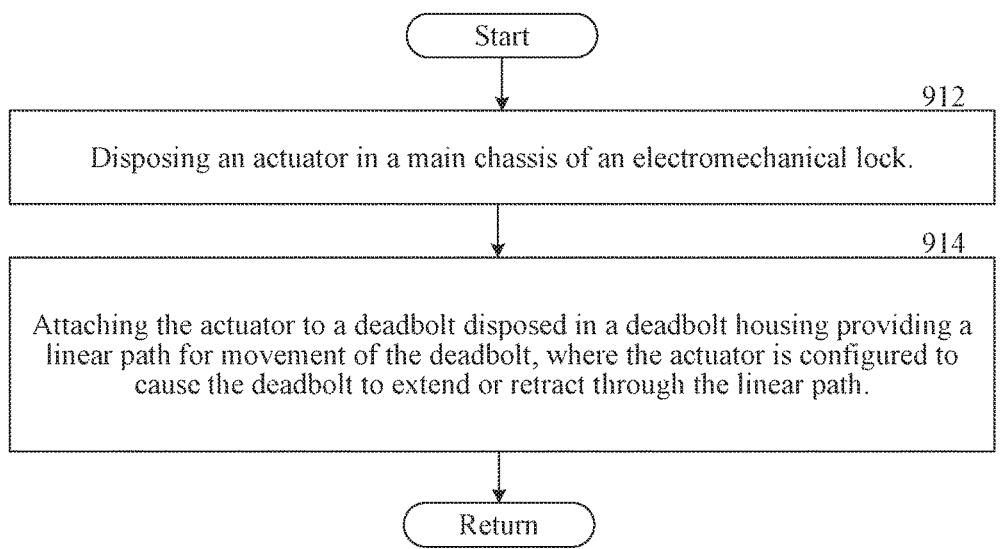
FIG. 9B is a flow diagram of a method for mechanically connecting a deadbolt with a main housing, according to an embodiment.

FIG. 9B is a flow diagram of a method for mechanically connecting a deadbolt with a main housing, according to an embodiment. An actuator can be disposed in a main chassis of an electromechanical lock (912). The actuator can be attached to a deadbolt disposed in a deadbolt housing where the deadbolt housing provides a linear path for movement of the deadbolt (914). The actuator can be configured to cause the deadbolt to extend or retract through the linear path provided by the deadbolt housing. The actuator can be attached to the deadbolt via a bolt carriage. The bolt carriage includes a groove attachable to a male detent connector attached to the deadbolt. The groove in the bolt carriage provides a mechanical connection to the deadbolt and also aligns electrical elements (e.g., pogo pins) with conducting elements of the bolt carriage to enable electrical transmission from the deadbolt to the main housing.

Figure 10:
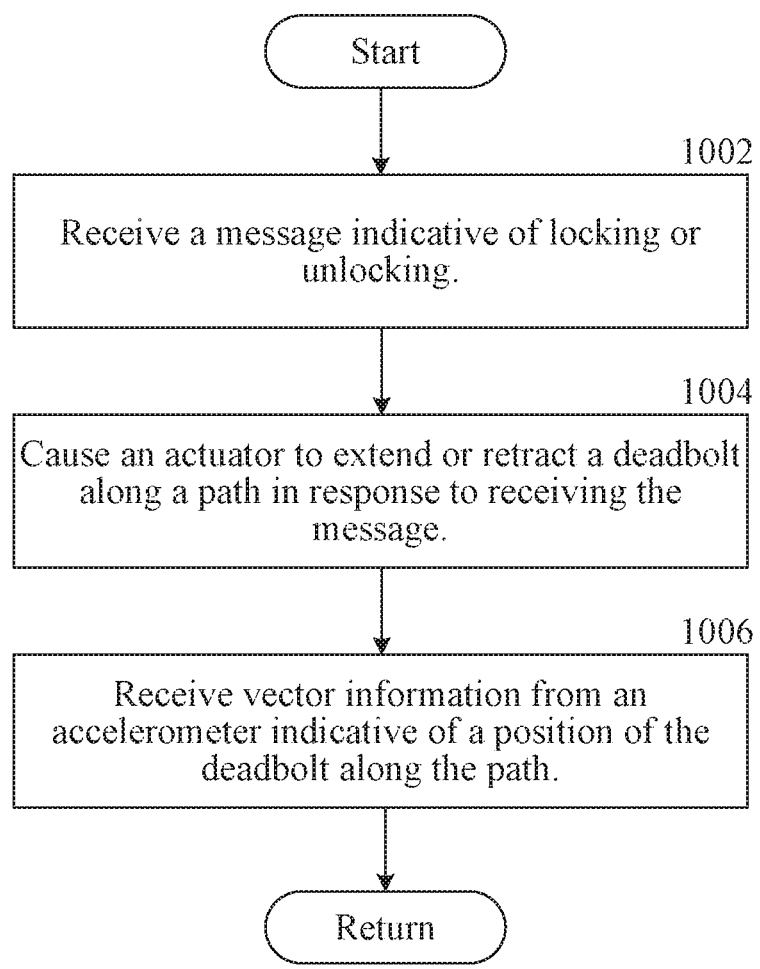
FIG. 10 is a flow diagram of a method for operating an electromechanical lock, according to an embodiment.

FIG. 10 is a flow diagram of a method for operating an electromechanical lock, according to an embodiment. The method can include receiving a message indicative of locking or unlocking (1002), causing an actuator to extend or retract a deadbolt along a path in response to receiving the message (1004), and receiving vector information from an accelerometer indicative of a position of the deadbolt along the path (1006).

In an embodiment, a control unit (e.g., a processor) receives a message indicative of locking or unlocking (1002). For example, a device (e.g., a mobile phone and/or smart watch) can transmit (e.g., directly or via one or more network devices) a message to an antenna disposed in a main chassis of the electromechanical lock. The antenna can relay the message to the control unit. The control unit can interpret the message to determine if the message is indicative of locking or unlocking. An cipher text and/or other encoded information can be contained in the message. The control unit can employ a cryptographic key compatible with an encryption algorithm employed in the transmitting device (e.g., the mobile phone and/or smart watch) to decrypt the cipher text and/or other encoded information. The decrypted information can be used to authenticate the transmitting device and/or determine if the message is indicative of locking or unlocking. If the transmitting device is authenticated and the message is determined to indicate locking or unlocking, the control unit can activate an actuator.

In an embodiment, a control unit causes the actuator to extend or retract a deadbolt along a path in response to receiving the message (1004). For example, if the message is determined to be indicative of unlocking, the control unit can cause the actuator to retract the deadbolt. In another example, if the message is determined to be locking, the control unit can cause the actuator to extend the deadbolt along the path. Extending the deadbolt along the path can cause the deadbolt to protrude out of a deadbolt housing and into a receiver in a door frame.

An accelerometer can be used to monitor a position of the deadbolt along the path. For example, the accelerometer can be configured to rotate along a non-linear path upon movement of the deadbolt along the linear path. As the deadbolt moves from a first linear position to a second linear position along the linear path, the accelerometer moves from a first non-linear position to a second non-linear position. The first and second non-linear positions of the accelerometer have distinct gravity vectors detectable by the accelerometer. The gravity vector detected by the accelerometer is transmitted to the control unit. The control unit receives the gravity vector detected by the accelerometer and uses the gravity vector to determine a position of the deadbolt along the path (1006). The control unit can transmit the determined position of the deadbolt to a device (e.g., a mobile phone and/or a smart watch) either directly or via a network (e.g., the internet). Particular positions can trigger an alert message indicating a position of the lock. For example, if the position of the deadbolt is less than a threshold extension distance (e.g., less than 0.5 inches extended), the control unit can automatically transmit an alert to one or more devices. The alert can indicate that the door may not be properly locked, indicate the extension distance, provide a prompt for a relock attempt, or any combination thereof. If the control unit receives a request for a relock attempt, the control unit can cause the deadbolt to retract and re-extend. After performing the relock attempt, the control unit can determine the extension distance and transmit a message to one or more devices indicating the extension distance following the relock attempt. The message and relock attempt can be repeated if the position of the deadbolt is less than the threshold extension distance following the relock attempt.

Figure 11A:
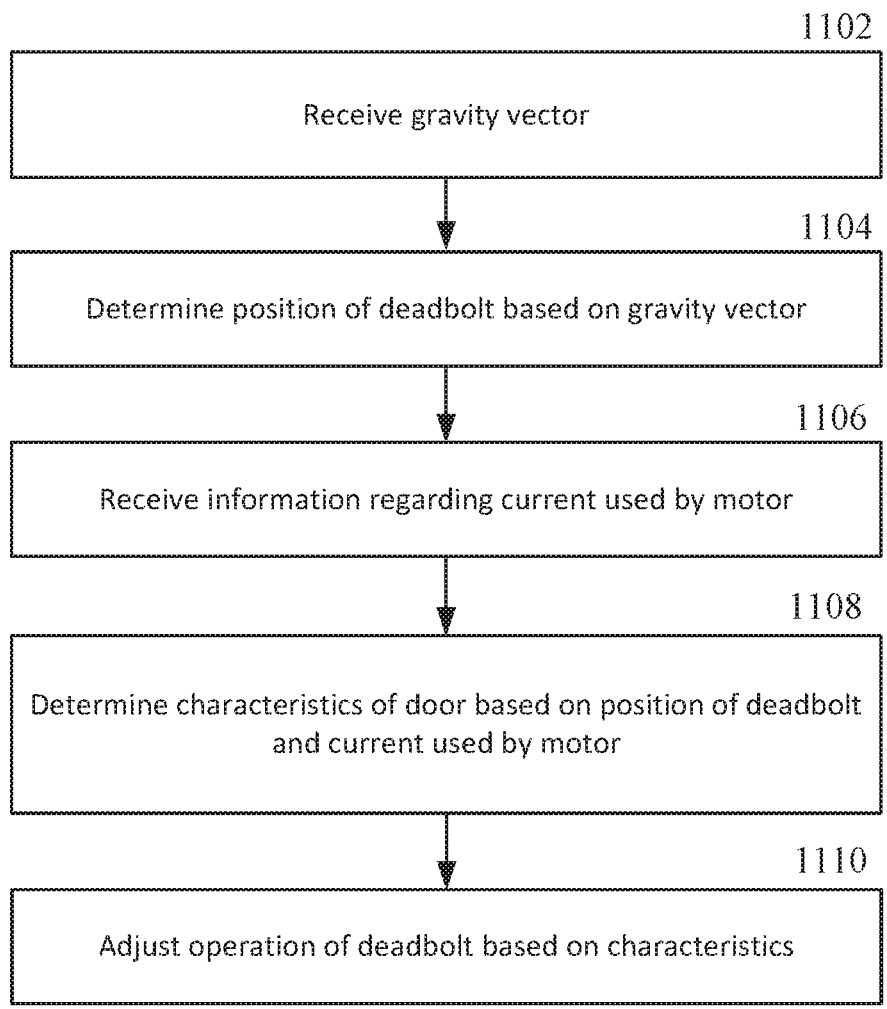
FIG. 11A is a flow diagram of a method for adjusting operation of a deadbolt based on characteristics of a door, according to an embodiment.

FIG. 11A is a flow diagram of a method for adjusting operation of a deadbolt based on characteristics of a door, according to an embodiment. A controller can receive gravity vector information (1102). For example, a controller can obtain gravity vector information from an accelerometer. Using the gravity vector, a position of a hollow bolt of the electromechanical lock can be determined (1104). For example, the position of a hollow bolt can be determined using gravity vector information. The controller can also receive information regarding the current used by an actuator (e.g., a shape memory device and/or a motor) to cause the hollow bolt to change positions (1106). For example, an actuator can be powered by an energy storage device (e.g., a battery) and, therefore, draw current as it pushes or pulls on the hollow bolt to extend or retract it, respectively. This current can be monitored and determined by a current sensor and information regarding the current can be provided to the controller.

The controller can then determine characteristics of the door, electromechanical lock, or deadbolt based on the position of the deadbolt and/or current used by the actuator. For example, in a controller can determine whether there is some obstruction blocking the entry of the hollow bolt into a bolt slot if the current used by an actuator is at or above some threshold current and the position of the hollow bolt is determined to correspond to one of the positions along arc in which it should be within the bolt slot. The controller can then adjust the operation of the hollow bolt based on the characteristics (1110). For example, if it is determined that there is an obstruction, then the controller can retract the hollow bolt and inform the a user that there is an obstruction preventing the electromechanical lock from locking door.

Many of the examples described herein include using the gravity vector as determined by an accelerometer. However, the same or different accelerometer can also provide other types of data. For example, an accelerometer can also provide information regarding acceleration of the component that it is placed upon. As a result, the accelerometer can determine the acceleration (or even merely the presence of acceleration) of the door as it swings towards an unlocked or locked state. This information can be provided to a controller and the controller can then retract the deadbolt so that it does not hit the door jamb. This can prevent damage to the door jamb, door, and/or electromechanical lock and also provide a more comfortable user experience if the user uses the smartphone to lock the door while it is swinging.

Figure 11B:
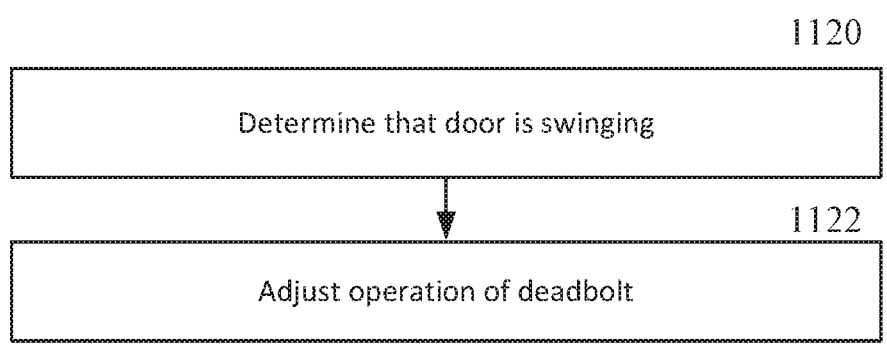
FIG. 11B is a flow diagram of a method for adjusting operation of a deadbolt, according to an embodiment.

FIG. 11B is a flow diagram of a method for adjusting operation of a hollow deadbolt, according to an embodiment. For example, an accelerometer can be used to determine that a hollow deadbolt is experiencing acceleration. Because the accelerometer can be housed within an electromechanical lock, this means that door is swinging open or closed. A controller can then adjust operation of the hollow deadbolt based on the determination that the door is swinging (510). For example, the controller can instruct an actuator to retract the hollow deadbolt to a position such that it would not strike the door jamb, for example, fully retracted to another position (e.g., a position just before when it would enter deadbolt slot).

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Computer

Figure 12:
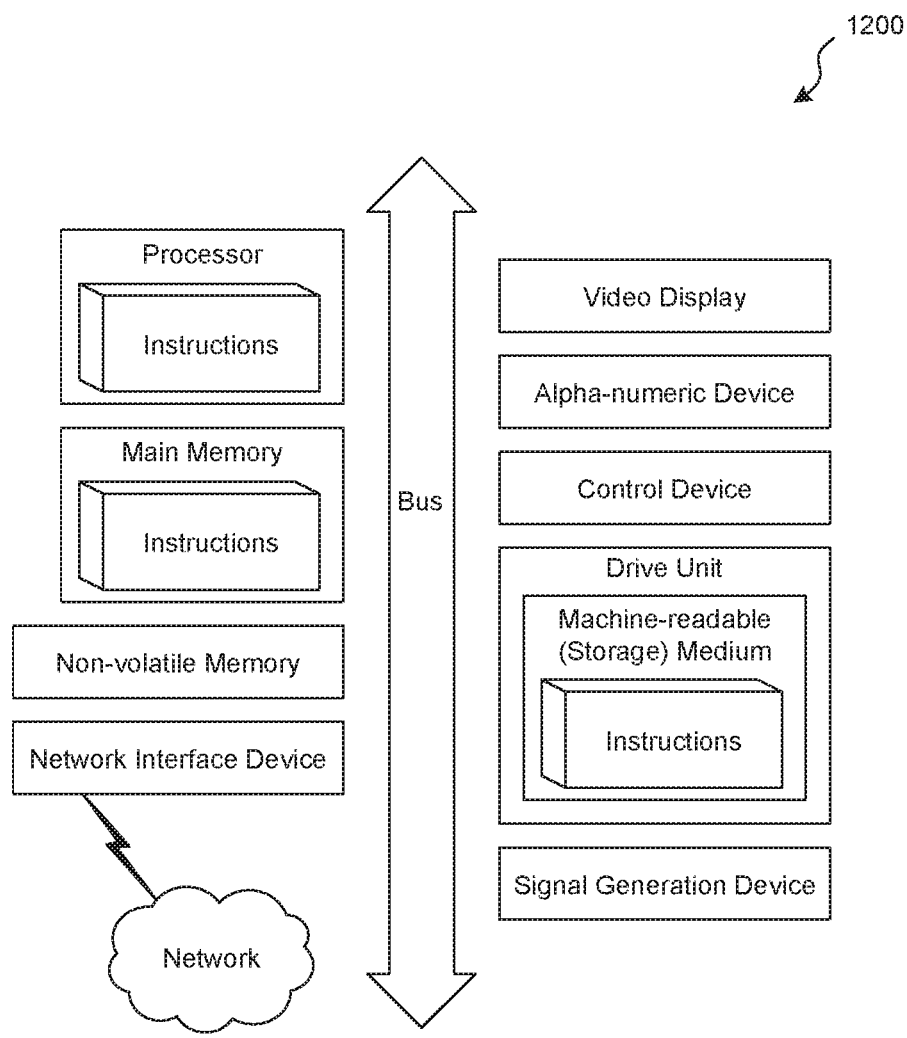
FIG. 12 is a diagrammatic representation of a machine in the example form of a computer system within which a set of instructions, for causing the machine to perform any one or more of the methodologies or modules discussed herein, can be executed.

FIG. 12 is a diagrammatic representation of a machine in the example form of a computer system 1200 within which a set of instructions, for causing the machine to perform any one or more of the methodologies or modules discussed herein, can be executed.

In the example of FIG. 12, the computer system 1200 includes a processor, memory, non-volatile memory, and an interface device. Various common components (e.g., cache memory) are omitted for illustrative simplicity. The computer system 1200 is intended to illustrate a hardware device on which any of the components described in the example of FIGS. 1-11 (and any other components described in this specification) can be implemented. The computer system 1200 can be of any applicable known or convenient type. The components of the computer system 1200 can be coupled together via a bus or through some other known or convenient device.

This disclosure contemplates the computer system 1200 taking any suitable physical form. As example and not by way of limitation, computer system 1200 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1200 can include one or more computer systems 1200; be unitary or distributed; span multiple locations; span multiple machines; or reside in a cloud, which can include one or more cloud components in one or more networks. Where appropriate, one or more computer systems 1200 can perform without substantial spatial or temporal limitation one or more steps of one or more methods described or illustrated herein. As an example and not by way of limitation, one or more computer systems 1200 can perform in real time or in batch mode one or more steps of one or more methods described or illustrated herein. One or more computer systems 1200 can perform at different times or at different locations one or more steps of one or more methods described or illustrated herein, where appropriate.

The processor can be, for example, a conventional microprocessor such as an Intel Pentium microprocessor or Motorola PowerPC microprocessor. One of skill in the relevant art can recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1200. The non-volatile storage can be local, remote, or distributed. The non-volatile memory is optional because systems can be created with all applicable data available in memory. A typical computer system can usually include at least a processor, memory, and a device (e.g., a bus) coupling the memory to the processor.

Software is typically stored in the non-volatile memory and/or the drive unit. Indeed, storing an entire large program in memory may not be possible. Nevertheless, it should be understood that for software to run, if necessary, it is moved to a computer readable location appropriate for processing, and for illustrative purposes, that location is referred to as the memory in this paper. Even when software is moved to the memory for execution, the processor can typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It can be appreciated that a modem or network interface can be considered to be part of the computer system 1200. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 12 reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts utilized by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The utilized structure for a variety of these systems can appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art can appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. An electromechanical lock configured to lock a door, the electromechanical lock comprising:
   a deadbolt;

an actuator disposed in a main housing, the actuator being configured to extend and/or retract a deadbolt along a path, wherein a deadbolt position corresponds to an extended position or a retracted position;
an energy storage device;
a hollow inner region in the deadbolt, wherein the hollow inner region of the deadbolt is configured to receive the energy storage device electrically connected to the main housing; and
a control unit disposed within the main housing, wherein the energy storage device provides power to the control unit when the deadbolt is in the extended position and when the deadbolt is in the retracted position.

2. The electromechanical lock of claim 1, wherein the deadbolt is electrically connected to the main housing via a bolt carriage, the bolt carriage being configured to attach to the deadbolt via a groove that causes electrical components of the deadbolt to align with electrical components of the bolt carriage.

3. The electromechanical lock of claim 1,
wherein the control unit is configured to cause the actuator to extend and/or retract the deadbolt along the path.

4. The electromechanical lock of claim 1, further comprising:
one or more components disposed in the main housing having an electrical connection to the energy storage device, wherein the one or more components include any of the actuator, the control unit, an accelerometer, and an antenna.

5. The electromechanical lock of claim 1, further comprising:
an accelerometer disposed along a non-linear path coupled with the path of the deadbolt, wherein the accelerometer traverses the non-linear path as the deadbolt traverses the path.

6. The electromechanical lock of claim 5,
wherein the control unit is configured to receive vector information from the accelerometer indicative of a position of the deadbolt along the path.

7. The electromechanical lock of claim 1, wherein an electrical connection between the deadbolt and the main housing is configured to deliver power to one or more components disposed in the main housing.

8. The electromechanical lock of claim 1, further comprising:
a deadbolt cap configured to secure the energy storage device within the deadbolt.

9. An apparatus, comprising:
a main housing configured to extend and retract a deadbolt;
a bolt housing attached to the main housing;
the deadbolt including a hollow inner region, the deadbolt being connected to a bolt carriage within the main housing;
an energy storage device;
wherein the hollow inner region of the deadbolt is configured to receive the energy storage device electrically connected to the main housing, and
wherein a deadbolt position corresponds to an extended position or a retracted position; and
a control unit disposed within the main housing, wherein the energy storage device provides power to the control unit when the deadbolt is in the extended position and when the deadbolt is in the retracted position.

10. The apparatus of claim 8, further comprising:
an actuator within the main housing configured to cause the deadbolt to extend and retract.

11. The apparatus of claim 10, wherein the actuator is powered by the energy storage device disposed within the hollow inner region of the deadbolt.

12. The apparatus of claim 9, further comprising:
an accelerometer configured to monitor the position of the deadbolt along a path, wherein the energy storage device provides electric power to the accelerometer.

13. The apparatus of claim 12, wherein the accelerometer is configured to rotate along a non-linear path as the apparatus transitions between an unlocked state and a locked state, wherein the accelerometer is configured to determine a gravity vector representing an inclination of the accelerometer along the non-linear path.

14. The apparatus of claim 9,
wherein the control unit is configured to manage an actuator, an accelerometer, an antenna, or any combination thereof.

15. The apparatus of claim 9, wherein the deadbolt includes an attachment mechanism configured to attach to the bolt carriage of the main housing, wherein the bolt carriage is configured to move the deadbolt.

16. The apparatus of claim 15, wherein the bolt carriage includes an electrical connection to the deadbolt.

17. The apparatus of claim 15, wherein the deadbolt is mechanically connected to the main housing via a male detent connector secured into a female groove of the bolt carriage.

18. An electromechanical lock, comprising:
a main housing having an actuator attached to a bolt carriage, the bolt carriage being configured to electrically and mechanically connect to a deadbolt, the actuator being configured to extend and/or retract the bolt carriage, wherein a deadbolt position corresponds to an extended position or a retracted position;
a bolt housing attached to and extending laterally from the main housing;
the deadbolt within the bolt housing and configured to connect to the bolt carriage, wherein the deadbolt includes a hollow inner region having an electrical contact configured to receive and contact an energy storage device;
the energy storage device; and
a control unit disposed within the main housing, wherein the energy storage device provides power to the control unit when the deadbolt is in the extended position and when the deadbolt is in the retracted position.

19. The electromechanical lock of claim 18, further comprising:
the energy storage device disposed in the hollow inner region of the deadbolt, wherein an electrical connection between the main housing and the deadbolt enables the energy storage device to power one or more components disposed in the main housing.

20. The electromechanical lock of claim 18, wherein the electrical contact configured to contact the energy storage device is configured to electrically connect to the actuator via an electrical connection between the main housing and the deadbolt.

21. The electromechanical lock of claim 18, further comprising:
an accelerometer configured to monitor the position of the deadbolt, wherein the electrical contact is further configured to electrically connect to the accelerometer via an electrical connection between the main housing and the deadbolt.

22. The electromechanical lock of claim 21, wherein the accelerometer is configured to rotate along a non-linear path as the electromechanical lock transitions between an unlocked state and a locked state, wherein the accelerometer is configured to determine a gravity vector representing an inclination of the accelerometer along the non-linear path.

23. The electromechanical lock of claim 18,
wherein the control unit is configured to manage the actuator, an accelerometer, an antenna, or any combination thereof, wherein the electrical contact configured to contact the energy storage device is configured to electrically connect to the control unit via an electrical connection between the main housing and the deadbolt.

24. The electromechanical lock of claim 18, wherein the deadbolt is mechanically connected to the main housing via a male detent connector secured into a female groove of the bolt carriage.

25. An electromechanical lock configured for installation in a door, the electromechanical lock comprising:
a main housing electrically and mechanically connected to a deadbolt, wherein the main housing is configured to extend the deadbolt to lock and/or unlock the door, wherein a deadbolt position corresponds to an extended position or a retracted position;
the deadbolt having an inner cavity, wherein the deadbolt is configured to receive an energy storage device in the inner cavity;
the energy storage device; and
a control unit disposed within the main housing, electrically connected to the main housing, wherein the energy storage device provides power to the control unit when the deadbolt is in the extended position and when the deadbolt is in the retracted position, wherein the control unit is configured to:
receive a message indicative of locking or unlocking; and
cause the deadbolt to extend or retract to lock and/or unlock the door in response to receiving the message.

26. The electromechanical lock of claim 25, wherein the deadbolt includes a nitride metal, a precipitation hardened alloy, or a combination thereof.

27. The electromechanical lock of claim 25, further comprising:
a bolt housing attached to and extending laterally from the main housing.

28. The electromechanical lock of claim 27, wherein the bolt housing includes an attachment mechanism configured to attach to the main housing.

29. The electromechanical lock of claim 25, further comprising:
a deadbolt cap configured to secure the energy storage device within the deadbolt.

30. The electromechanical lock of claim 25, further comprising:
an actuator attached to a bolt carriage, the actuator within the main housing, wherein the bolt carriage is electrically and mechanically connected to the deadbolt, the actuator configured to extend and/or retract the deadbolt.

31. The electromechanical lock of claim 30, wherein an electrical contact configured to contact the energy storage device is configured to electrically connect to the actuator via the electrical connection between the main housing and the deadbolt.

32. The electromechanical lock of claim 30, wherein the deadbolt is mechanically connected to the main housing via a male detent connector secured into a female groove of the bolt carriage.

33. The electromechanical lock of claim 25,
wherein the energy storage device disposed in the inner cavity of the deadbolt, wherein the electrical connection between the main housing and the deadbolt enables the energy storage device to power one or more components disposed in the main housing.

34. The electromechanical lock of claim 25, further comprising:
an accelerometer configured to monitor a position of the deadbolt, wherein an electrical contact configured to contact the energy storage device is configured to electrically connect to the accelerometer via the electrical connection between the main housing and the deadbolt.

35. The electromechanical lock of claim 34, wherein the accelerometer is configured to rotate along a non-linear path as the electromechanical lock transitions between an unlocked state and a locked state, wherein the accelerometer is configured to determine a gravity vector representing an inclination of the accelerometer along the non-linear path.

36. The electromechanical lock of claim 34, wherein the accelerometer is powered by the energy storage device.

37. The electromechanical lock of claim 25,
wherein the control unit is configured to manage an actuator, an accelerometer, an antenna, or any combination thereof, and
wherein an electrical contact configured to contact the energy storage device is configured to electrically connect to the control unit via the electrical connection between the main housing and the deadbolt.

* * * * *